US007101108B1

(12) United States Patent
Chuang

(10) Patent No.: US 7,101,108 B1
(45) Date of Patent: Sep. 5, 2006

(54) COLLAR FOR TAKING HOLD OF FIXATION PIECE OF WINDOW SHADE ROD

(76) Inventor: Lung-Tang Chuang, P.O. Box 453, Taichung (TW)

( * ) Notice: Subject to any disclaimer, the term of this patent is extended or adjusted under 35 U.S.C. 154(b) by 56 days.

(21) Appl. No.: 10/740,413

(22) Filed: Dec. 22, 2003

(51) Int. Cl.
*F16D 1/00* (2006.01)

(52) U.S. Cl. ........................ 403/227; 403/314; 403/371

(58) Field of Classification Search ................ 403/223, 403/225, 227, 202, 203, 292, 314, 351, 368, 403/371, 372
See application file for complete search history.

(56) References Cited

U.S. PATENT DOCUMENTS 2,950,937 A * 8/1960 Bedford, Jr. ................ 403/372
3,007,726 A * 11/1961 Parkin ........................ 403/372
3,932,048 A * 1/1976 DuPont ....................... 403/225
4,636,106 A * 1/1987 Waisbrod .................... 403/228
4,712,811 A * 12/1987 Wier .......................... 285/113
5,758,860 A * 6/1998 Hanazaki et al. ........... 248/634
5,810,504 A * 9/1998 Rabinovich ................. 403/371
5,924,816 A * 7/1999 Schuele ...................... 403/371
5,931,598 A * 8/1999 Wang ......................... 403/351
6,155,017 A * 12/2000 Turner ....................... 52/726.4
6,213,677 B1 * 4/2001 Yamane et al. ............. 403/329
6,470,553 B1 * 10/2002 Retzbach ..................... 29/450

* cited by examiner

*Primary Examiner*—Gary S. Hartmann
(74) *Attorney, Agent, or Firm*—Alan D. Kamrath; Nikolai & Mersereau, P.A.

(57) ABSTRACT

A tubular collar is used to take hold of a fixation piece at one longitudinal end of a window shade rod. The collar is provided in an outer wall with a plurality of axial grooves extending through both longitudinal ends of the collar. The collar is provided in an interior with an inner tube extending along the longitudinal direction of the collar. The inner tube is provided with a groove segment and a grooveless segment. The fixation piece is set firmly in place in such a way that the grooved segment of the inner tube is caused to expand by a projection of the fixation piece so as to force the collar to press against the inner wall of a hole of the longitudinal ends of the window shade rod, and that the projection of the fixation piece is intimately embraced by the grooveless segment of the inner tube.

2 Claims, 4 Drawing Sheets

COLLAR FOR TAKING HOLD OF FIXATION PIECE OF WINDOW SHADE ROD

BACKGROUND OF THE INVENTION

1. Field of the Invention

The present invention relates generally to a window shade structure, and more particularly to a collar which is inserted into one end of a window shade rod for taking hold of a fixation piece that is used to set the window shade rod firmly in place.

2. Description of Related Art

The conventional window shade rod is provided in both ends with a collar for holding a fixation piece which is used to set the window shade rod firmly in place. The conventional collar is of a tubular construction and is provided with an inner hole into which a projection of the fixation piece is inserted. The inner end of the projection is secured. However, the outer end of the projection is prone to sideward motion.

SUMMARY OF THE INVENTION

The primary objective of the present invention is to provide a window shade rod with a collar which is free of the drawback of the conventional collar described above.

In keeping with the principle of the present invention, the foregoing objective of the present invention is attained by a tubular collar which is provided with an inner tube. The inner tube is held firmly in place by a plurality of ribs, which are used to connect the inner tube to the inner wall of the collar. The collar is provided in the periphery with a plurality of axial grooves extending through both longitudinal ends of the collar. The inner tube is provided with a plurality of axial grooves corresponding to the axial grooves of the collar. However, the axial grooves do not extend through the inner end of the inner tube. As the projection of a fixation piece is inserted into the inner tube, the inner tube is expanded to press against the inner wall of one end of the window shade rod. Meanwhile, the fixation piece is securely located.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
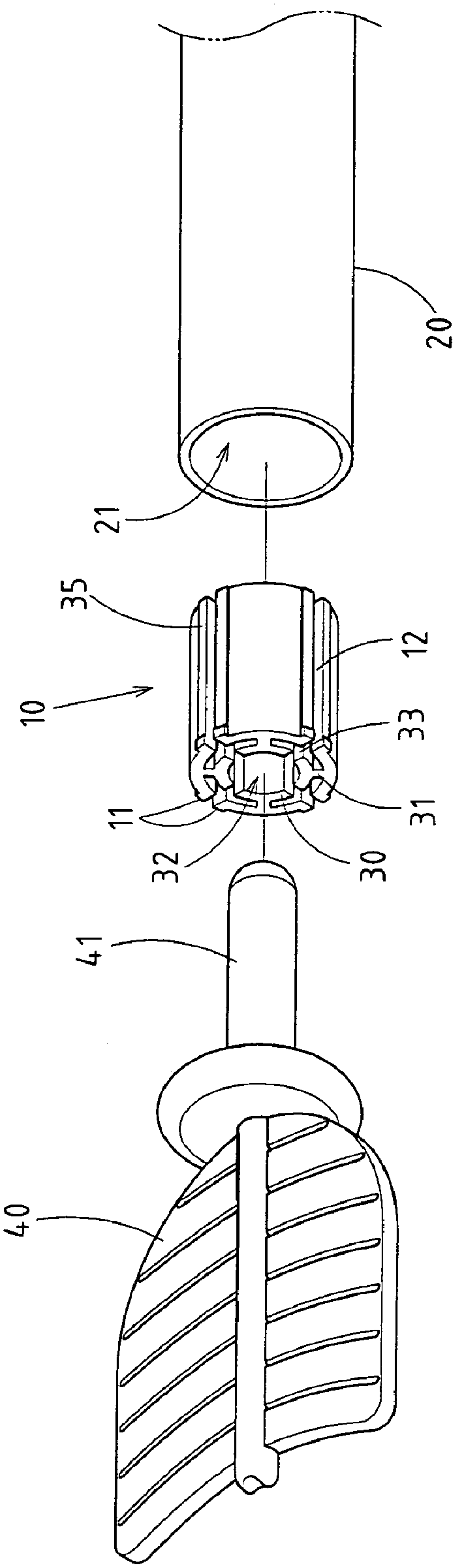
FIG. 1 shows an exploded view of the preferred embodiment of the present invention.

As shown in FIGS. 1–4, a tubular collar 10 embodied in the present invention is inserted into an end hole 21 of a window shade rod 20 for taking hold of a projection 41 of a fixation piece 40 which is used to secure the window shade rod 20.

The collar 10 is provided at an outer end with a plurality of stop edges 11, by means of which the collar 10 is prevented from sliding into interior of the window shade rod 20. The tubular collar 10 is provided in the outer wall with a plurality of grooves 12, which are arranged at intervals and are extended along the longitudinal direction of the tubular collar 10.

Figure 2:
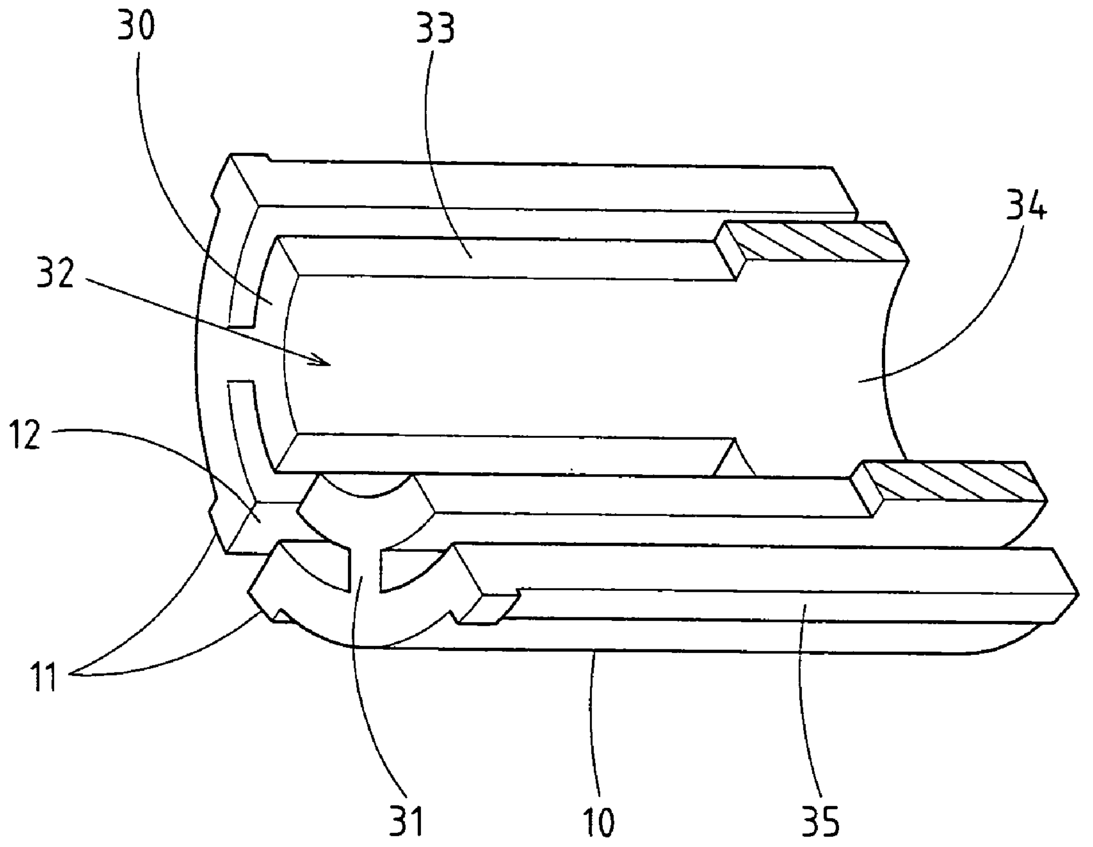
FIG. 2 shows a longitudinal sectional view of a collar of the preferred embodiment of the present invention.
Figure 3:
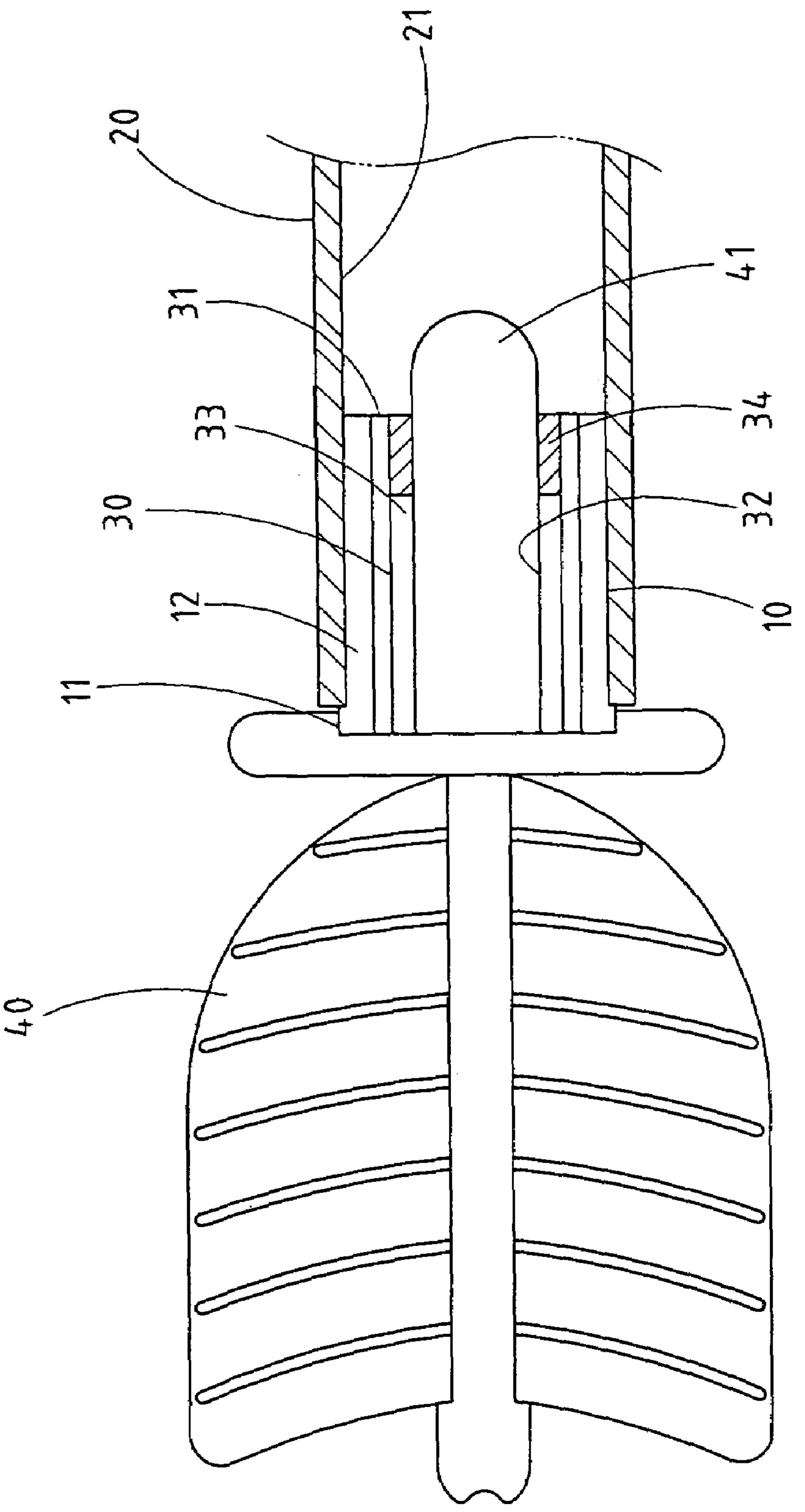
FIG. 3 shows a longitudinal sectional view of the preferred embodiment of the present invention in combination.
Figure 4:
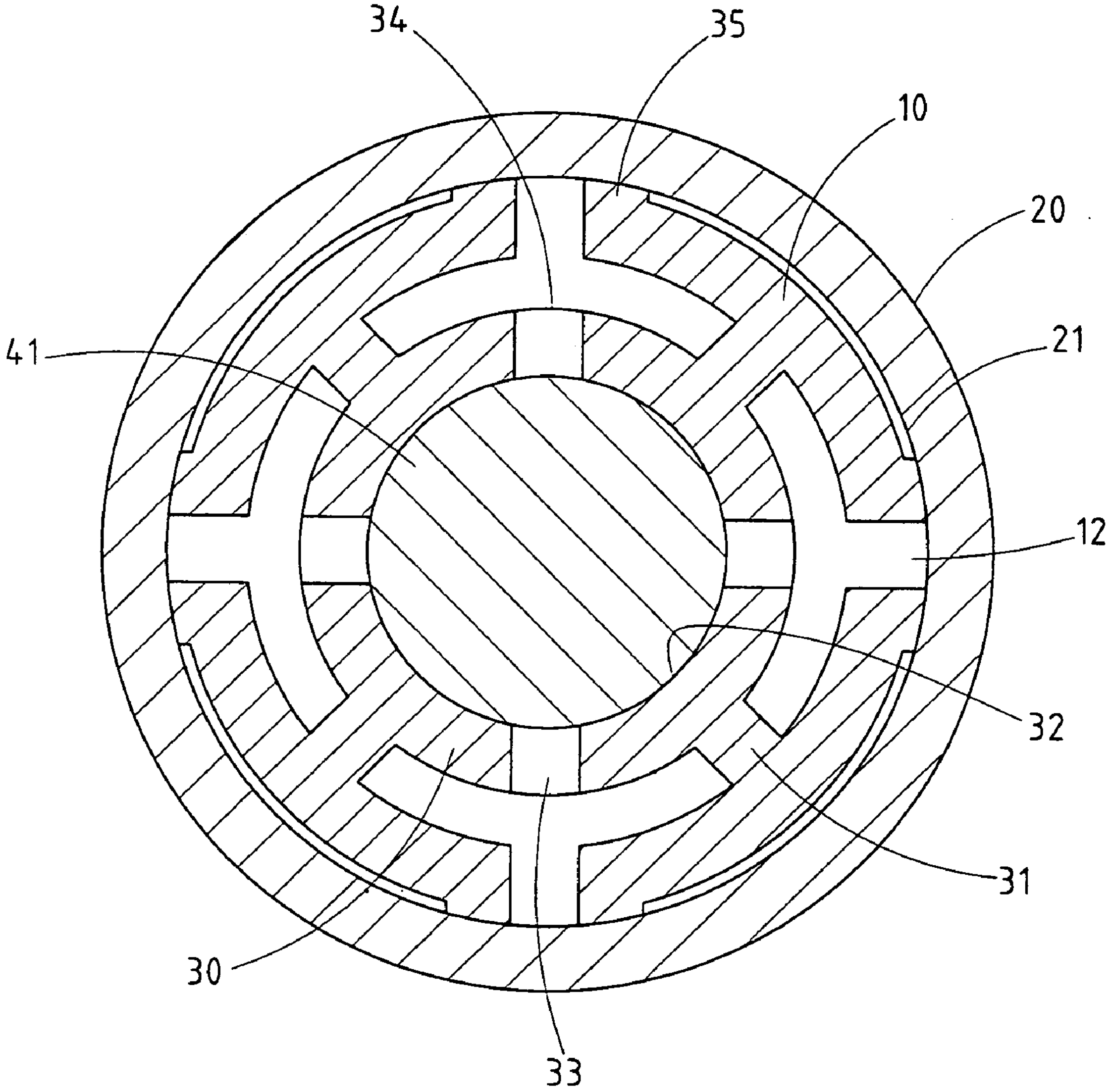
FIG. 4 shows a cross-sectional view of the preferred embodiment of the present invention in combination.

The collar 10 is provided therein with an inner tube 30, which is set firmly in place by a plurality of ribs 31 serving to connect the inner tube 30 with the inner wall of the collar 10. The inner tube 30 is provided with an inner hole 32 extending through both longitudinal ends of the inner tube 30 which is extended along the longitudinal direction of the tubular collar 10. The inner tube 30 is provided with a plurality of axial grooves 33 corresponding to the grooves 12 of the collar 10. However, the axial grooves 33 do not extend through the inner end of the inner tube 30, as shown in FIGS. 2 and 3. As a result, the inner end of the inner tube 30 is provided with a grooveless segment 34.

As shown in FIG. 3, the projection 41 of the fixation piece 40 is inserted into the inner hole 32 of the inner tube 30. In light of the inner tube 30 being partially grooved, the grooved segment of the inner tube 30 is urged by the projection 41 to expand to cause the collar 10 to press against the inner wall of the end hole 21 of the window shade rod 20. In the meantime, the projection 41 of the fixation piece 40 is intimately embraced by the grooveless segment 34 of the inner tube 30.

The collar 10 is further provided in the outer wall with a plurality of longitudinal ribs 35 contiguous to the longitudinal grooves 12 of the collar 10. These longitudinal ribs 35 are intended to reduce the frictional contact area between the inner wall of the end hole 21 of the window shade rod 20 and the collar 10 at such time when the collar 10 is inserted into the end hole 21 of the window shade rod 20.

The embodiment of the present invention described above is merely illustrative. Accordingly, the present invention may be embodied in other specific forms without deviating from the spirit thereof. The present invention is therefore to be limited only by the scopes of the following claims.

I claim:

1. A tubular collar in combination with a fixation piece of a window shade rod, wherein:

the collar has an outer end provided with a plurality of stop edges and an outer wall formed with a plurality of grooves extending through two longitudinal ends of the collar;

the collar has an interior provided with an inner tube extending along a longitudinal direction of the collar;

the inner tube is connected with the collar by a plurality of ribs located between the inner tube and the collar;

the inner tube is formed with a plurality of axial grooves corresponding to the grooves of the collar;

the axial grooves do not extend through an inner end of the inner tube, thereby forming a grooved segment and a grooveless segment in the inner tube;

the collar is inserted into an end hole of the window shade rod;

the fixation piece has a projection inserted into the inner tube to expand the grooved segment of the inner tube to force the collar to press an inner wall of the end hole of the window shade rod;

the projection of the fixation piece has an inner end embraced by the grooveless segment of the inner tube.

2. The tubular collar in combination with the fixation piece of the window shade rod as defined in claim 1, wherein the outer wall of the collar is provided with a plurality of longitudinal ribs contiguous to said grooves of the outer wall of said collar to reduce a frictional contact area of said collar when said collar is inserted into the end hole of the window shade rod.

* * * * *